United States Patent
Zamora Esquivel et al.

(10) Patent No.: US 12,067,477 B2
(45) Date of Patent: Aug. 20, 2024

(54) MULTI-LAYER NEURAL NETWORKS USING SYMMETRIC TENSORS

(71) Applicant: Intel Corporation, Santa Clara, CA (US)

(72) Inventors: Julio Zamora Esquivel, Zapopan Jal (MX); Hector Cordourier Maruri, Jal (MX); Jose Camacho Perez, Jalisco Jal (MX); Paulo Lopez Meyer, Jal (MX); Jesus Adan Cruz Vargas, Jal (MX)

(73) Assignee: Intel Corporation, Santa Clara, CA (US)

( * ) Notice: Subject to any disclaimer, the term of this patent is extended or adjusted under 35 U.S.C. 154(b) by 340 days.

(21) Appl. No.: 17/526,628

(22) Filed: Nov. 15, 2021

(65) Prior Publication Data
US 2022/0147800 A1    May 12, 2022

Related U.S. Application Data (63) Continuation of application No. 15/924,947, filed on Mar. 19, 2018, now Pat. No. 11,205,114.

(51) Int. Cl.
*G06N 3/048* (2023.01)
*G06N 3/08* (2023.01)
*G06N 3/084* (2023.01)

(52) U.S. Cl.
CPC .............. *G06N 3/048* (2023.01); *G06N 3/08* (2013.01); *G06N 3/084* (2013.01)

(58) Field of Classification Search
CPC ..................................................... G06N 3/048
USPC .......................................................... 706/25
See application file for complete search history.

(56) References Cited

U.S. PATENT DOCUMENTS

| | | | |
|---|---|---|---|
| 2011/0202876 A1* | 8/2011 | Badger | G06F 40/274 706/12 |
| 2014/0278298 A1* | 9/2014 | Maerten | G01V 20/00 703/2 |
| 2016/0055409 A1* | 2/2016 | Majumdar | G06N 3/042 706/20 |
| 2019/0034783 A1* | 1/2019 | Liu | G06N 3/043 |
| 2020/0143240 A1 | 5/2020 | Baker | |

OTHER PUBLICATIONS

Office Action mailed Apr. 6, 2021 for U.S. Appl. No. 15/924,947, 13 pages.

* cited by examiner

*Primary Examiner* — Moazzam Hossain
(74) *Attorney, Agent, or Firm* — Schwabe, Williamson & Wyatt, P.C.

(57) ABSTRACT

Methods and apparatuses for implementing a neural network using symmetric tensors. In embodiments, a system may include a higher order neural network with a plurality of layers that includes an input layer, one or more hidden layers, and an output layer. Each of the input layer, the one or more hidden layers, and the output layer includes a plurality of neurons, where the plurality of neurons includes at least first order neurons and second order neurons, and where inputs at a second order neuron are combined using a symmetric tensor.

12 Claims, 10 Drawing Sheets

MULTI-LAYER NEURAL NETWORKS USING SYMMETRIC TENSORS

CROSS REFERENCE TO RELATED APPLICATIONS

The present application is a Continuation of U.S. application Ser. No. 15/924,947, filed Mar. 19, 2018 entitled "MULTI-LAYER NEURAL NETWORKS USING SYMMETRIC TENSORS", the contents of which is hereby incorporated by reference in its entirety.

TECHNICAL FIELD

The present disclosure generally relates to the field of neural networks, in particular, to multi-layer neural networks using symmetric tensors.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Current Neural Network (NN) topologies used for deep learning include fully connected layers, typically as output layers. Typically, neurons used in the fully connected layer represent hyperplanes, or in other words, multi-dimensional linear units. To resolve non-linear problems a combination of several layers of linear units may be used.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

The present disclosure presents methods and apparatuses for high order NNs with multiple layers, where the neurons include at least second order neurons. Embodiments may include a system comprising a higher order neural network having a plurality of layers including an input layer, one or more hidden layers, and an output layer, where each of the input layer, the one or more hidden layers, and the output layer includes a plurality of neurons. The plurality of neurons may include at least first order neurons and second order neurons where the inputs at a second order neuron may be combined using a symmetric tensor.

In order to resolve non-linear problems, neurons in legacy implementations may combine several layers of linear units, increasing the memory required and the computer complexity for evaluation and training. Existing higher order NNs typically contain only one hidden layer, and do not take advantage of deep learning approaches. As a result, they may have training rules are typically computationally expensive.

Embodiments described herein may increase the order of the NN and decrease the number of layers in the NN. This may result in a reduction of the number of activation functions required and may reduce the time consumed for training. For example, each layer removed may reduce hundreds of activation functions.

Embodiments of high-order units may be used to solve non-linear problems using non-linear hyperplanes, which may reduce the number of neurons used in a NN and may also reduce the number of layers. This may reduce the number of transcendental functions by reducing the need for layers. As a result, this may reduce the training and computational complexity otherwise required by using legacy linear units.

Embodiments as disclosed herein may increase the order of the NN by using a symmetrical tensor, reducing the number of layers and units required to resolve a non-linear problem and having a substantial impact on the complexity of evaluation and training.

In the description to follow, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the terms "interface" and "engine" may refer to, be part of, or include an Application Specific Integrated Circuit (ASIC), an electronic circuit, a programmable combinational logic circuit (e.g., field programmable gate arrays (FPGA)), a processor (shared or dedicated) and/or memory (shared or dedicated) that execute a plurality of programming instructions of one or more software or firmware programs to provide the described functionality.

Figure 1:
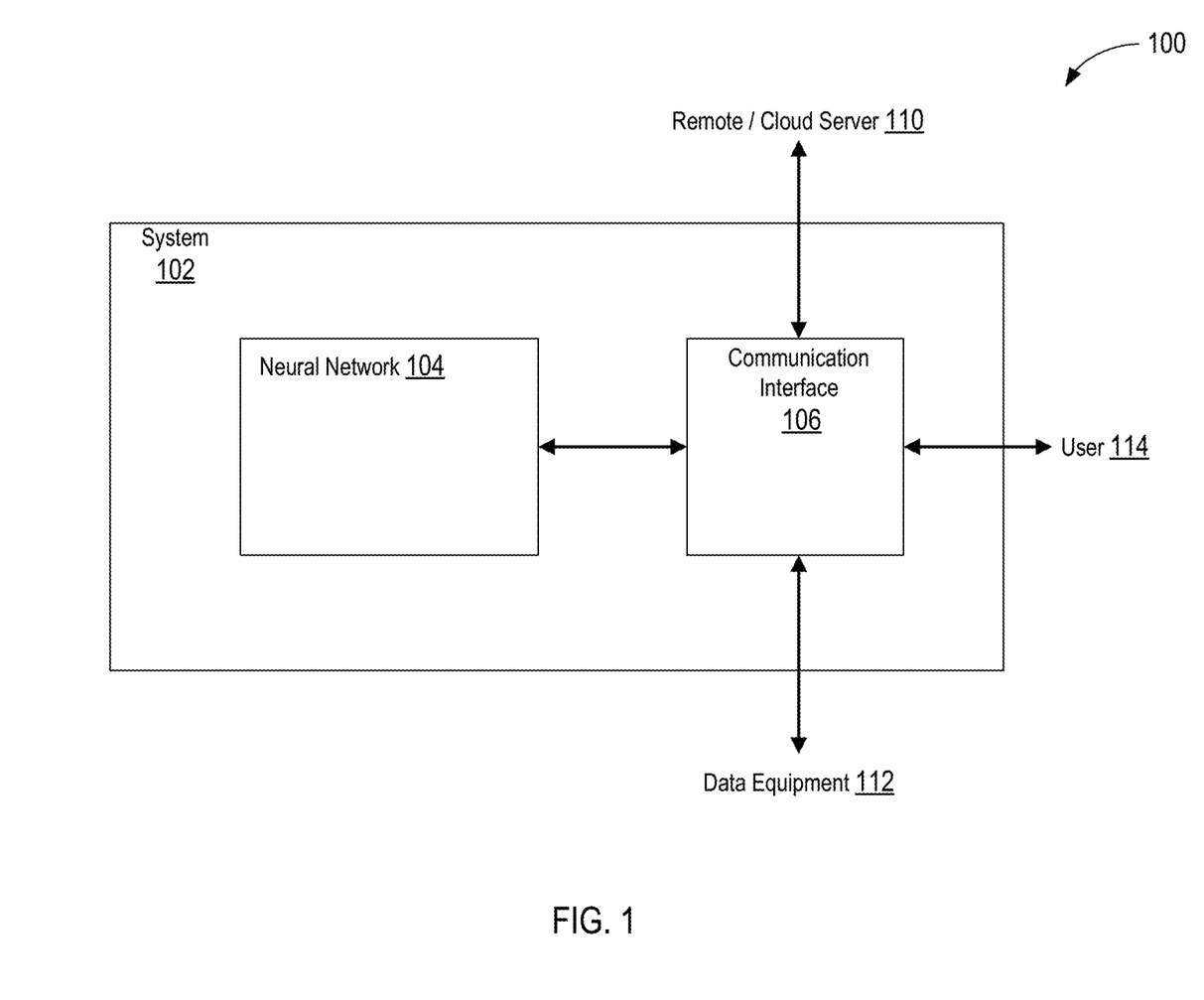
FIG. 1 illustrates an overview of an example system having a neural network, in accordance with various embodiments.

FIG. 1 illustrates an overview of an example system having a neural network, in accordance with various embodiments. Diagram 100 shows, in embodiments, system 102 that may include a neural network 104, which may be connected to a communication interface 106. The system 102 may be a part of a computing system, an apparatus, or a device. Neural network 104 may be used to classify given pattern or data set into predefined classes, trained to produce a prediction in response to a set of inputs, or identify a special feature of the input data and classify/cluster them into different categories without any prior knowledge of the data.

In embodiments, the neural network 104 may be implemented using a multilayer approach that may involve multiple layers, at least first and second order neurons, where the second order neurons operate as described below. In embodiments, the neural network may receive data from or communicate data through a communications interface 106. The communications interface 106 may interact with remote or cloud based servers 110 or data equipment 112, such as sensors or other equipment that may report data to be used in training or accessing the neural network 104. In embodiments, the communications interface 106 may communicate with a user 114 to directly or indirectly access the neural network 104. In embodiments, neural network 104 may be initially trained by a machine learning system. Further, neural network 104 may be configured to adapt via self-learning, during usage.

Figure 2:
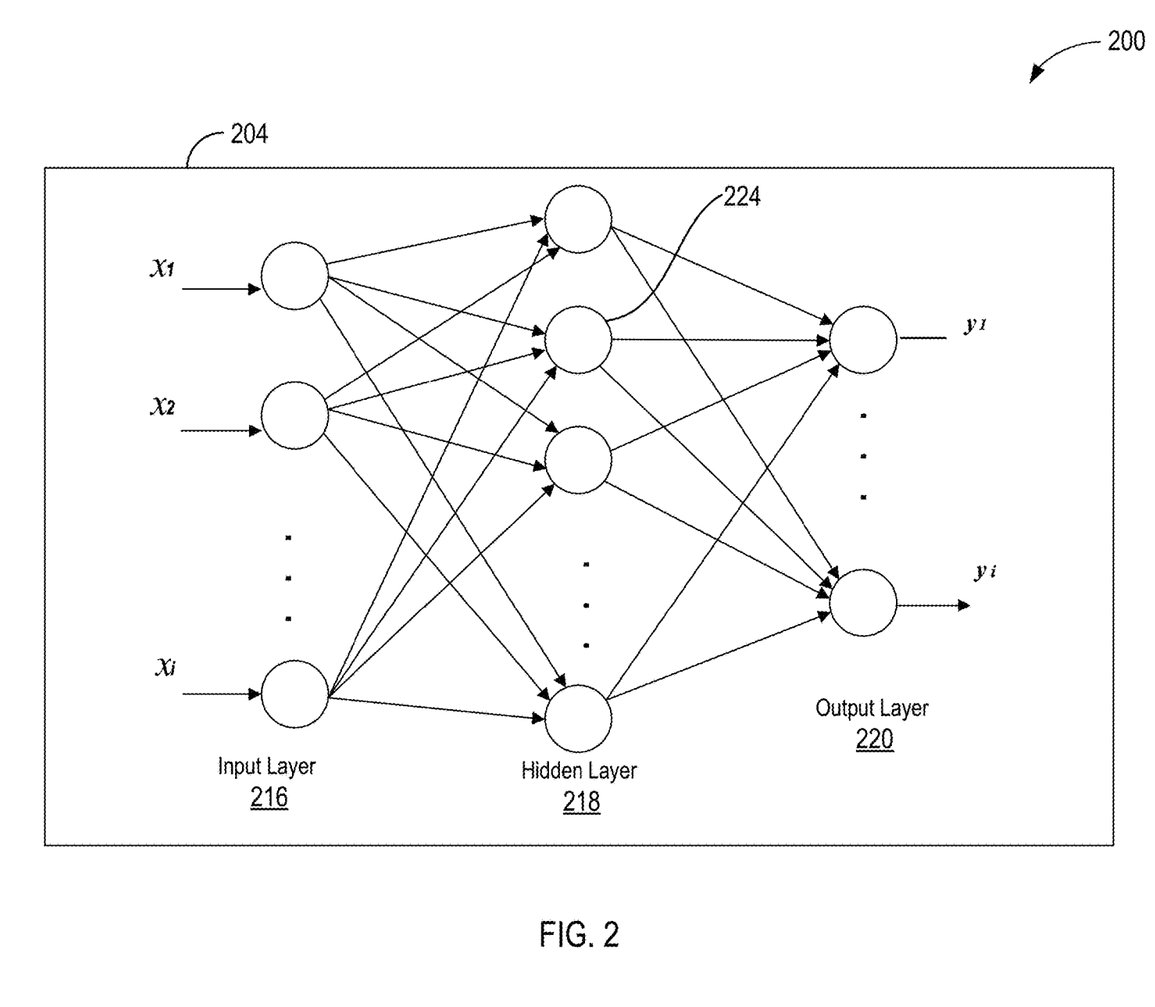
FIG. 2 illustrates an example neural network, in accordance with various embodiments.

FIG. 2 illustrates an example neural network, in accordance with various embodiments. Diagram 200 shows a neural network 204, which may be similar to neural network 104 of FIG. 1. The neural network 204 may include an input layer 216, a plurality of hidden layers 218 (one shown for ease of illustration and understanding), and an output layer 220. The input layer 216 may receive data $x_i$ as inputs. Each hidden layer(s) 218 may include a number of second order neurons 224 to process the inputs $X_i$, and eventually, output layer 220 may output data $y_i$. Neurons 224 include at least first order and second order neurons.

In embodiments, a second order neuron 224 having inputs that may be combined using a symmetric tensor. In embodiments, the symmetric tensor may include a symmetric matrix Q where the inputs $X_i$ are combined as follows:

$$S = X_i^T Q X_i$$

where X are the inputs, $X_i^T$ is the transpose of $X_i$ and S is the result of the combined inputs. This function may represent a quadric, which in a two-dimensional scenario may represent an ellipse or a hyperbola, a parabola, or a plane, depending upon the values of the weights represented in the matrix Q.

Quadratic tensor. An example of a two dimensional symmetric tensor may be a quadratic tensor. In the example of a quadratic tensor, a one-dimensional input may be used. In this example, the symmetric tensor may be written as a 2×2 matrix using one input and a bias. Generally, a new column and a new row may be added for each additional input.

In this example, a quadratic solution using three weights as shown below: a, b, c.

$$[x \ 1] \begin{bmatrix} a & b/2 \\ b/2 & c \end{bmatrix} \begin{bmatrix} x \\ 1 \end{bmatrix} = ax^2 + bx + c$$

Then, the increment of inputs produces an increment in the number of weights in the tensor, $Ax^2 + 2Bxy + Cy^2 + 2Dx + 2Ey + F = 0$ Defining the symmetric Q tensor as:

$$x = \begin{bmatrix} x \\ y \\ 1 \end{bmatrix} \ x^T = [x, y, 1] \ Q = \begin{bmatrix} A & B & D \\ B & C & E \\ D & E & F \end{bmatrix}$$

The equation can be expressed as:

$$x^T Q x = 0$$

Which is a quadratic equation in projective geometry.

Quadratic tensor Training Rules. In the quadratic tensor example, the output layer may be created using one quadratic perceptron, which may be similar to a neuron. In embodiments, training may be done following the gradient descendant algorithm, and using as activation function the sigmoid, $$f = \frac{1}{(1 + e^{-S})}$$

where $s = x^T Q x$ is the quadratic combination of all inputs, i.e. the first layer's outputs, and where f may be the activation function, and s may be the accumulation of energy sum. In embodiments, s may be similar to the sum of $w_i * x_i$. In embodiments, the matrix Q may be determined by the weights:

$$Q = \begin{bmatrix} w_{11} & w_{12} & w_{13} \\ w_{12} & w_{22} & w_{23} \\ w_{13} & w_{23} & w_{33} \end{bmatrix}$$

In embodiments, to use the gradient descendant algorithm, the error function may be defined as:

$$E = \frac{1}{2}(d-f)^2$$

Where d represents the desired output for a given input (x, y) in case of a two dimensional input, and f represents the actual output. The training rule for the i-the weight ($w_i$) may be given by the error derivative (using the descendant gradient):

$$\frac{\partial E}{\partial w_{ij}} = (d-f)(f)(1-f)\frac{\partial s}{\partial w_{ij}}$$

Where the derivative $$\frac{\partial s}{\partial w_{ij}} = x_i x_j$$

may have as a training rule:

$$\frac{\partial E}{\partial w_{ij}} = (d-f)(f)(1-f)x_i x_j$$

This may represent only one extra multiplication compared with the traditional linear perceptron. The sensibility, which may be similar to the amount of error back-propagated to a specific input, may be computed using:

$$\frac{\partial E}{\partial x} = (d-f)(1-f)fQx$$

This may produce a vector, which i-th component represent a derivative with respect to $x_i$ Regarding each weighting factor, $w_t$ may be computed as follows:

$$w_t = w_{t-1} + (d-f)(f)(1-f)x_i x_j$$

Cubic Tensor. Another example of a symmetric tensor may be a cubic tensor. In this example, the cubic tensor can be seen as a volume of weights. A 2×2×2 tensor may be used for one input and tensor:

$$[x\ 1]\begin{bmatrix}[x\ 1]\begin{bmatrix}a & b/3\\b/3 & c/3\end{bmatrix}\begin{bmatrix}x\\1\end{bmatrix}\\[x\ 1]\begin{bmatrix}b/3 & c/3\\c/3 & d\end{bmatrix}\begin{bmatrix}x\\1\end{bmatrix}\end{bmatrix}\begin{bmatrix}x\\1\end{bmatrix} = ax^3 + bx^2 + cx + d$$

In this example, the energy collected by the inputs may be equal to:

$$s = Q_{ijk} x_i x_j x_i$$

Cubic Tensor training rule. The cubic tensor training rule may be:

$$\frac{\partial E}{\partial w_{ijk}} = (d-f)(f)(1-f)x_i x_j x_k$$

With this training rule, three cumulus of energy, which may be a cluster or cloud of points in a dimensional space, may be clustered together by using a single neuron. For example, with respect to FIG. 6, the solution as shown by diagram 652 may be represented by a single high-order neuron using the cubic tensor. In legacy implementations, at least two layers of perceptions with at least seven linear neurons may be required.

Figure 3:
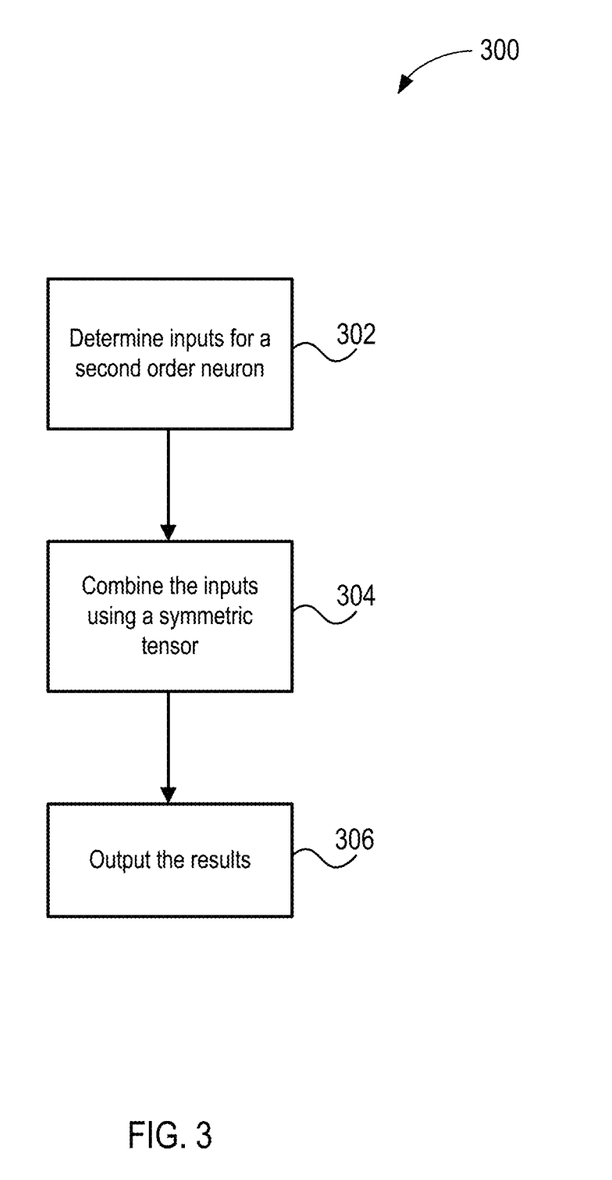
FIG. 3 illustrates an overview of an example process of using the neural network system, in accordance with various embodiments.

FIG. 3 illustrates an overview of an example process of using the neural network system, in accordance with various embodiments. As shown, process 300 shows a process that may include operations of blocks 302-306. The operations may be performed by the neural network 204 of FIG. 2. In alternate embodiments, process 300 may include more or less operations, or with some of the operations combined or sub-divided.

Process 300 may start at block 302. At block 302, the process may be to determine inputs for a second order neuron in a layer of a multi-layer neural network. In embodiments, the second order neuron may correspond to neuron 224 within the hidden layer 218 of FIG. 2. The determined inputs for the neuron may be as shown neuron 224 that may originate from neurons in the input layer 216. In embodiments, the inputs may correspond to a vector $X_i$, and may be from nodes within another hidden layer (not shown). In embodiments, inputs may represent a vector descriptor of a pattern. Inputs may also be Mel-frequency cepstral coefficients (MFCCs) from audio, a raw image arranged as a vector, a binarized contour from segmentation, a descriptor coming from previous convolutional layers, and the like. In embodiments, the input may generally be a signature to identify a pattern that provides sufficient information to distinguish from other patterns.

At block 304, the process may be to combine the inputs using a symmetric tensor. In embodiments, the symmetric tensor may be as described for FIG. 2, and may include the symmetric matrix Q. In embodiments, the $X_i$ input vector received from block 302 may have its transposition multiplied by the matrix Q, and have that result multiplied by the original $X_i$ input vector to determine a result.

At block 306, the process may be to output the result. In embodiments, the result may be output as input to a subsequent node of a hidden layer 218 or of an output layer 220. In embodiments, the output may be the classification result of the input or input pattern. For example, in gesture recognition the output may represent the gesture detected. In audio, the output may be the command or the recognized word. In image recognition, the output may be a representation of the image segmentation pixel by pixel.

Figure 4:
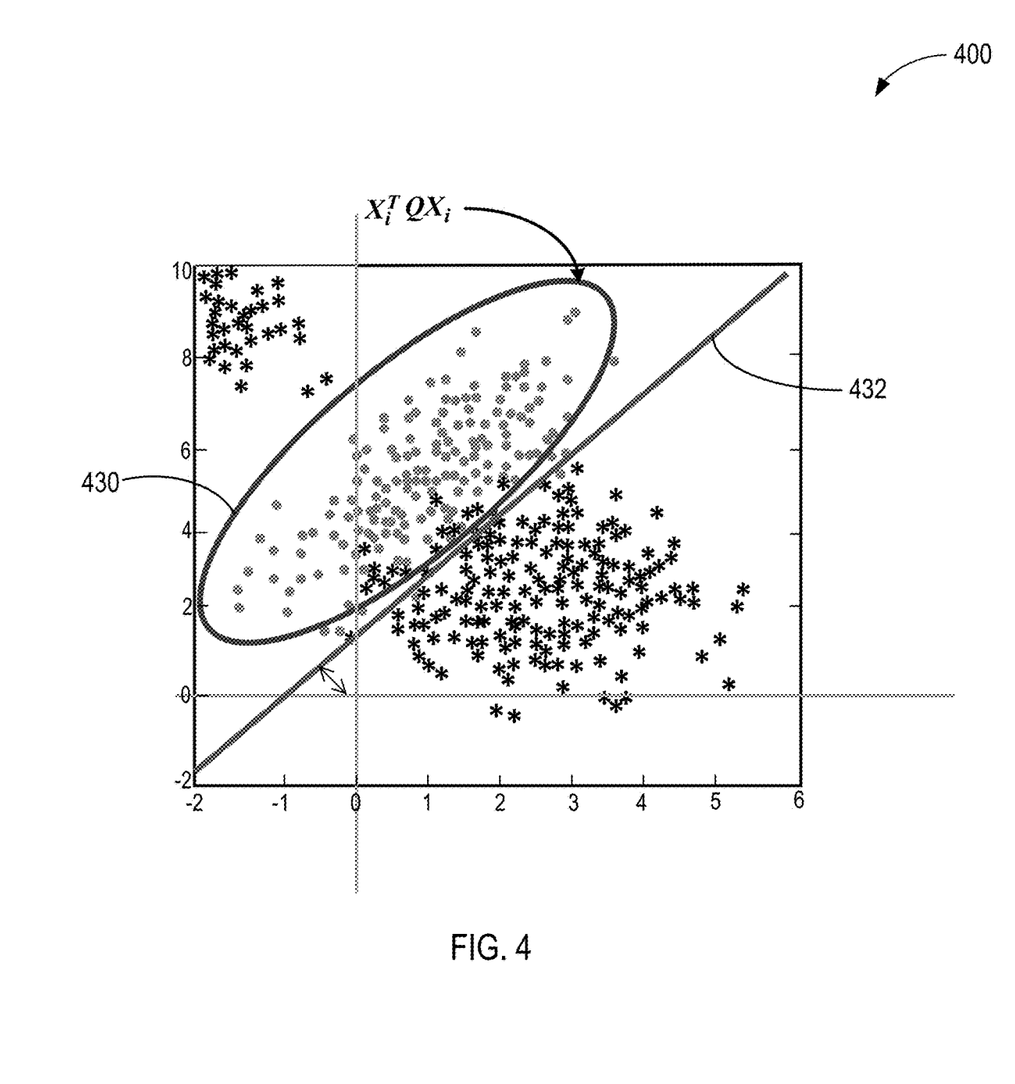
FIG. 4 illustrates an example implementation of a quadratic symmetric tensor versus a linear hyperplane, in accordance with various embodiments.

FIG. 4 illustrates an example implementation of a quadratic symmetric tensor versus a linear hyperplane, in accordance with various embodiments. Diagram 400 shows a number of points on a xy axis representing input and output values. The ellipse 430 identifies a cluster of points marked by a dot that represents a quadratic neuron, using a two dimensional scenario with a grade 2 tensor, of the form $S = X_i^T Q X_j$. The neuron represented by the ellipse 430 largely identifies the desired points (represented by dots, in contrast to those points represented by an x). In legacy implementations, the neuron may be represented by a linear equation 432, which does not identify the desired points. Rather, additional linear equations (not shown) and multiple calculations would be need to be added as multiple neurons in legacy implementations to linearly identify the region of the desired points.

Figure 5:
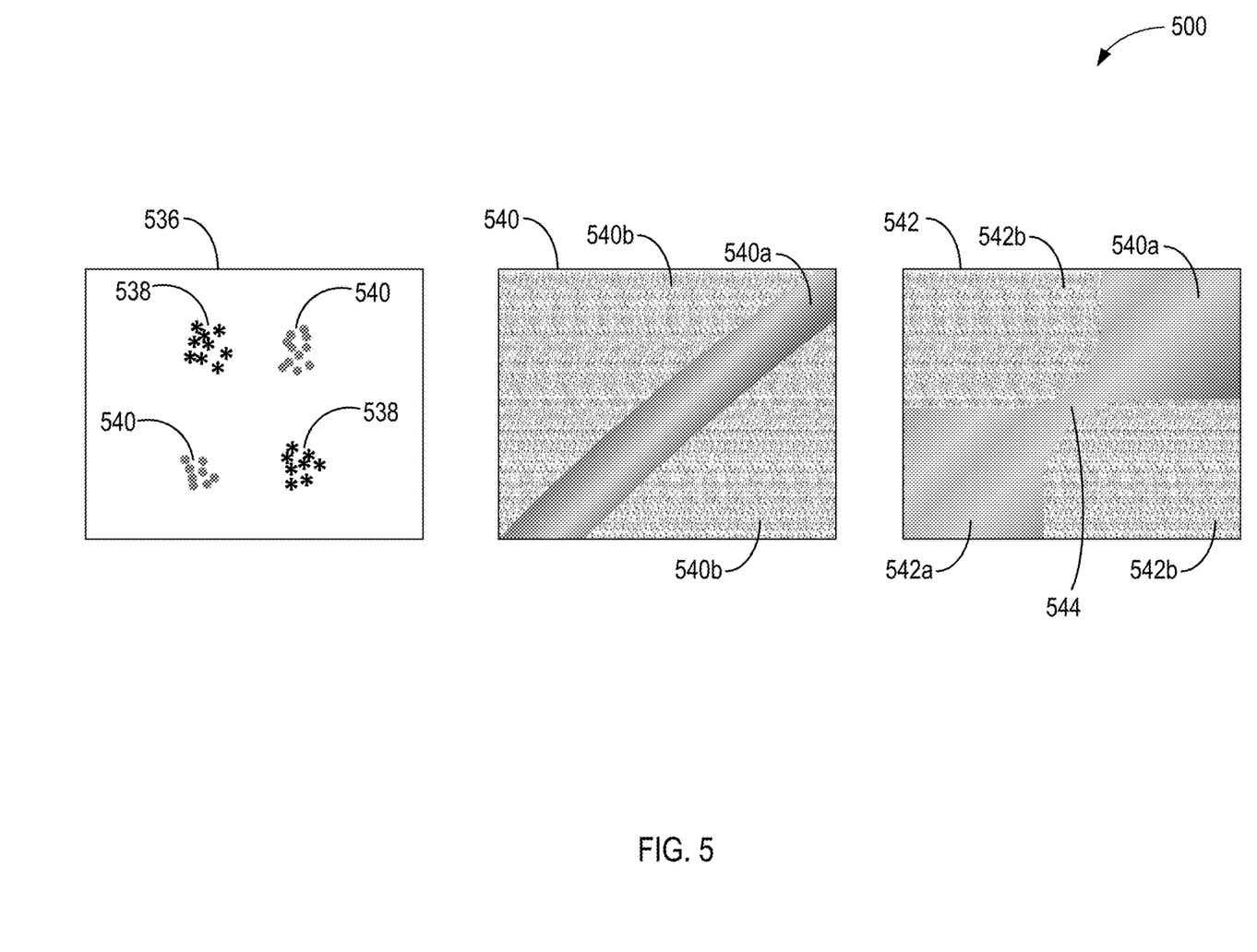
FIG. 5 illustrates an example exclusive or (XOR) problem implementation as a symmetric tensor versus a linear hyperplane, in accordance with various embodiments.

FIG. 5 illustrates an example exclusive or (XOR) problem implementation as a symmetric tensor versus a linear hyperplane, in accordance with various embodiments. Diagram 500 shows various stages of implementing an XOR problem using a using a symmetric tensor implemented as a quadratic neuron in comparison with a linear hyperplane. Diagram 536 shows a cluster of a first set of points 538 and a second set of points 540 used to generate (train) the XOR problem. Diagram 540 shows graphically the result of the XOR problem shown in diagram 536 solved using legacy implementations involving three linear units (perceptrons). Band 540a represents the region where points similar to points 540 may lie, and the area 540b outside of band 540a represents the region where points similar to points 538 may lie.

Diagram 542 shows graphically the result of the XOR problem shown in diagram 536 solved using embodiments herein, in particular a symmetric tensor implemented as a single quadratic neuron. In this case, the quadratic neuron represents a parabolic-like shape. Area 542a represents the regions where points similar to points 540 may lie, and area 542b represents the regions where points similar to points 538 may lie. In addition to providing a more accurate representation of the initial cluster of patterns in diagram 536, the quadratic neuron also indicates an overlap of regions at center point 544 to indicate areas of ambiguity.

Figure 6:
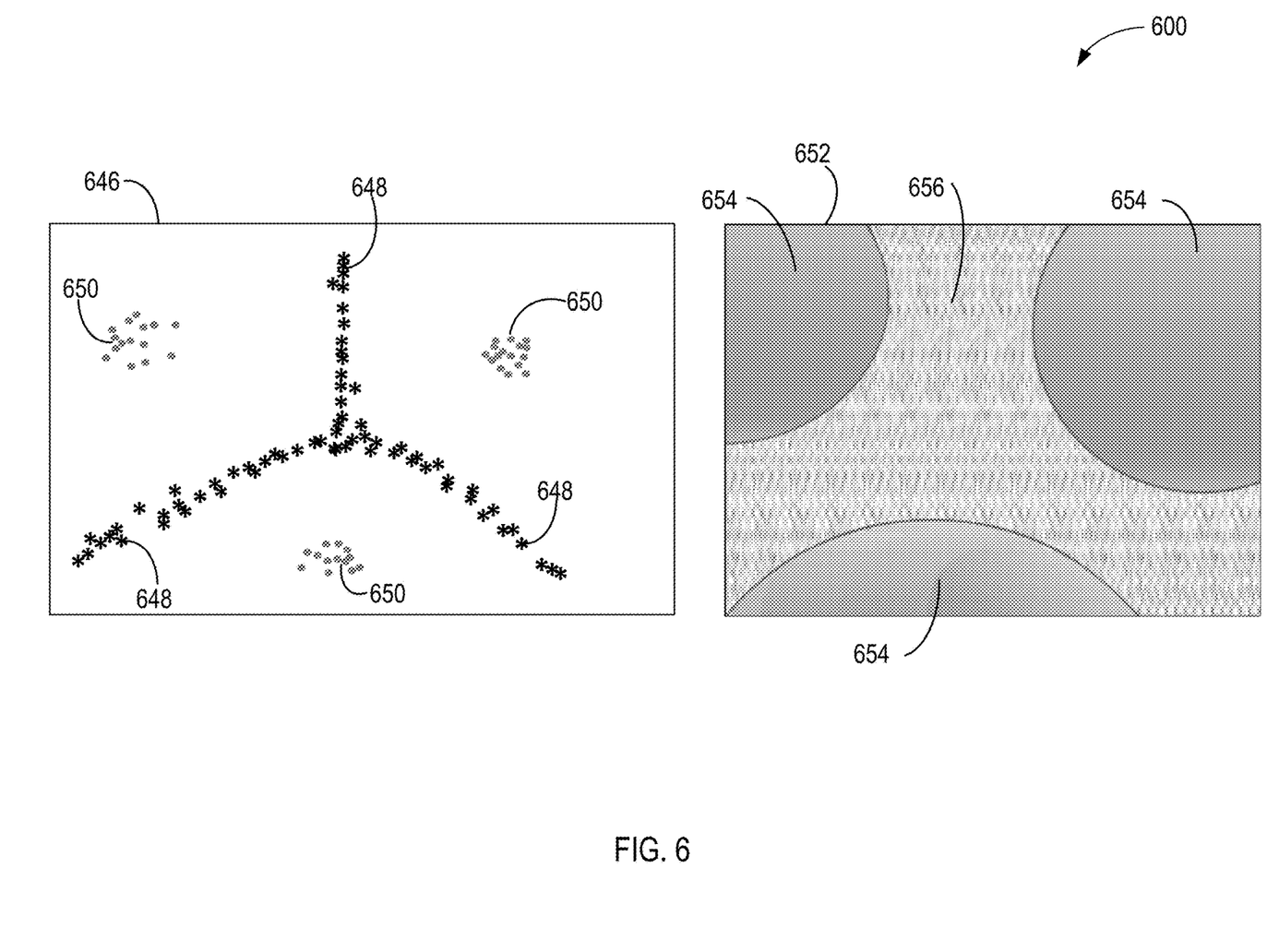
FIG. 6 illustrates an example implementation of a single neuron in a hidden layer based on a distribution of training patterns, in accordance with various embodiments.

FIG. 6 illustrates an example implementation of a single neuron in a hidden layer based on a distribution of training patterns, in accordance with various embodiments. Diagram 646 shows a first cluster of points 648 and a second cluster of points 650 used to train a symmetric cubic tensor as described above of a single neuron. Diagram 652 shows the resulting solution created by the single neuron, with areas 654 representing regions where points similar to points 650 may lie, and with area 656 representing regions where points similar to points 648 may lie.

Figure 7:
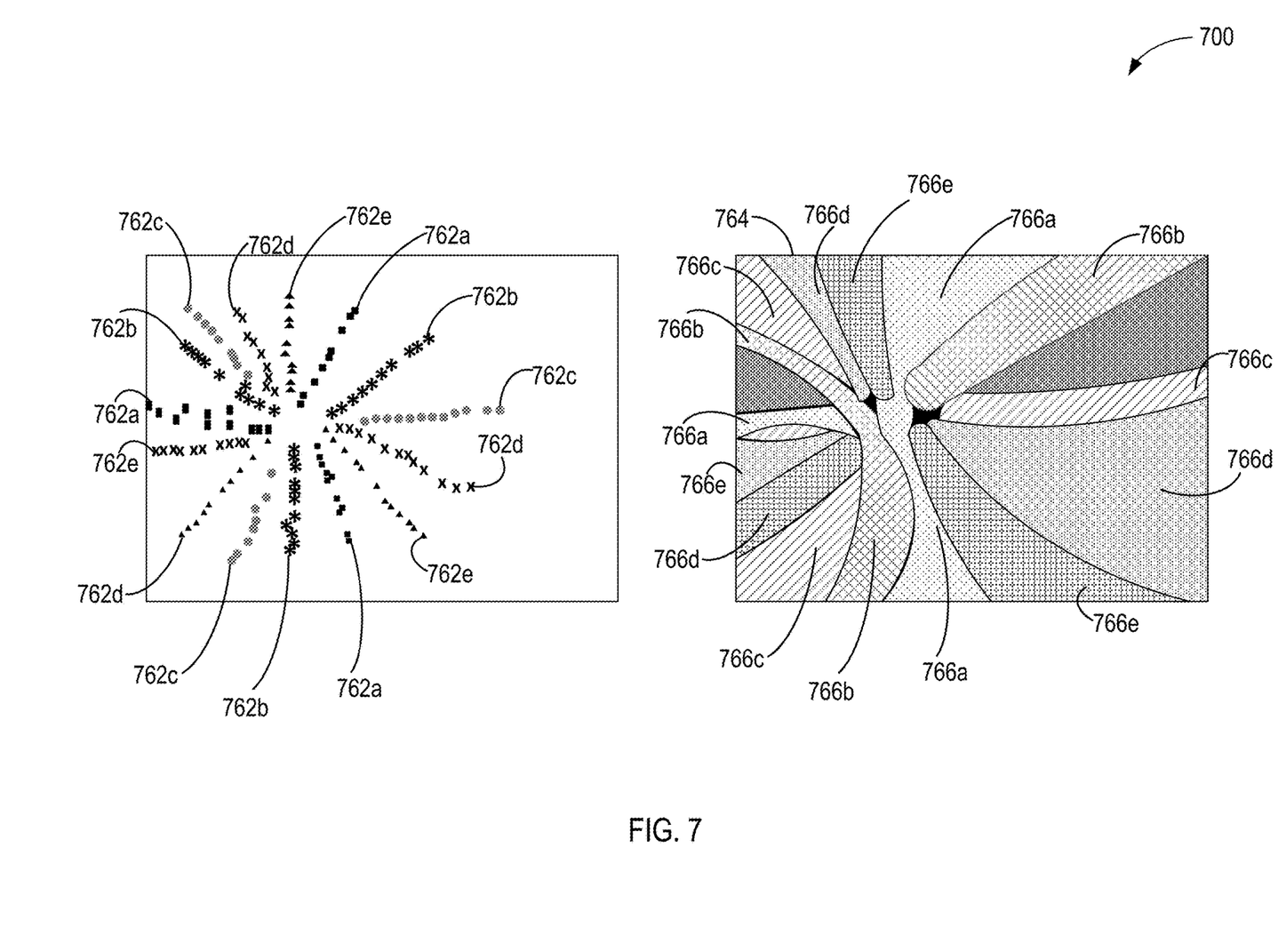
FIG. 7 illustrates an example implementation of 12 neurons in a hidden layer based on a distribution of training patterns, in accordance with various embodiments.

FIG. 7 illustrates an example implementation of 12 neurons in a hidden layer based on a distribution of training patterns, in accordance with various embodiments. Diagram 760 shows five different clusters of points 762a-762e used to train neurons using a symmetric tensor. Diagram 764 shows the resulting solution created by the 12 neurons, with areas 766a-766e representing regions, respectively, where points similar to the points 762a-762e may lie.

Figure 8:
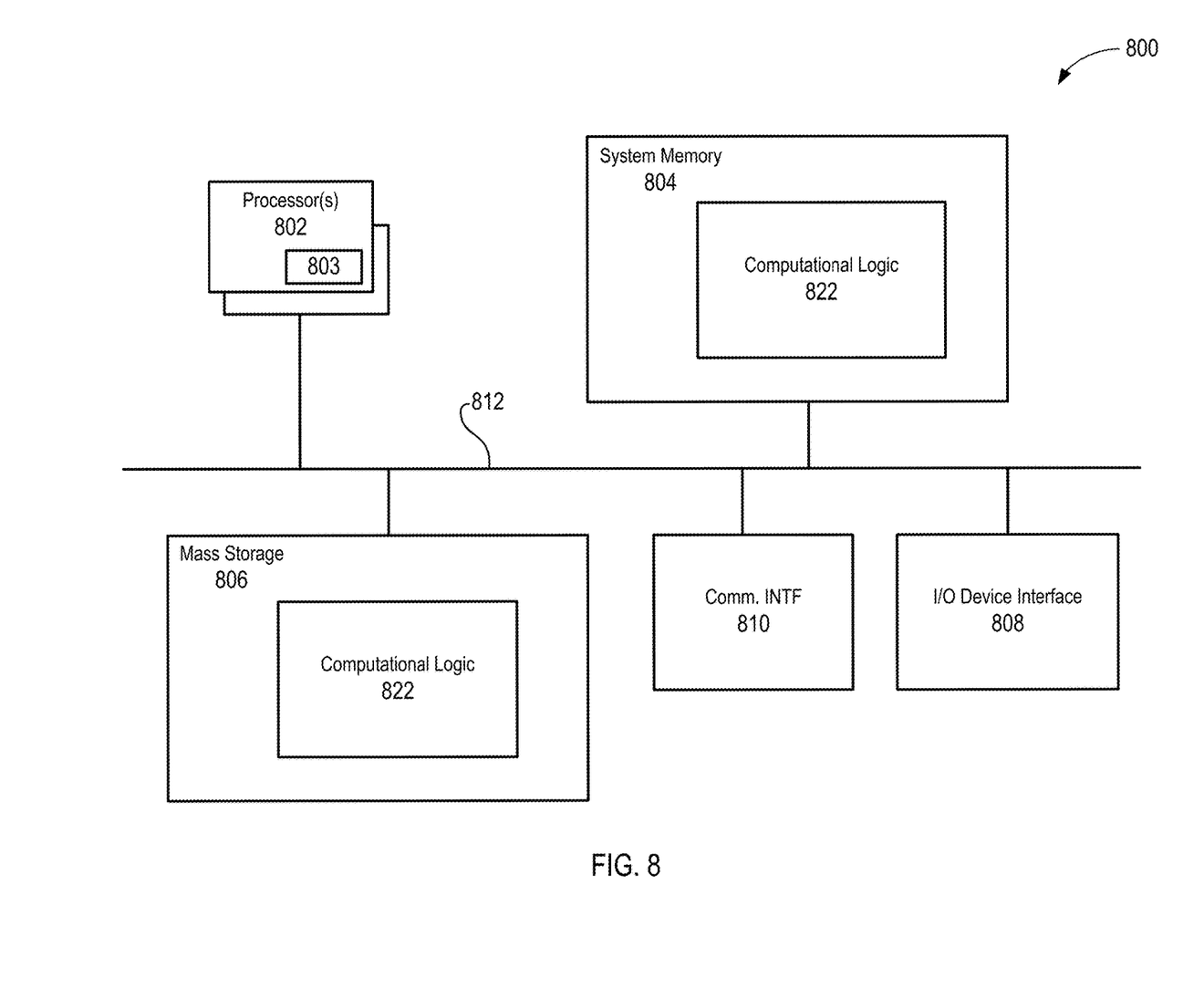
FIG. 8 illustrates an example computer system, suitable for use to practice the present disclosure (or aspects thereof), in accordance with various embodiments.

FIG. 8 illustrates an example computer system, suitable for use to practice the present disclosure (or aspects thereof), in accordance with various embodiments.

As shown, in embodiments, computer device 800 may include one or more processors 802 and system memory 804. Each processor 802 may include one or more processor cores wherein one or more neuron of a layer of a multi-layer neural network may operate in one of the one or more cores. In embodiments, the processors 802 may be graphics processors. In embodiments, the processors 802 may execute a plurality of threads, wherein one or more neurons of a layer of a multi-layer neural network may operate in one of the plurality of execution threads. In embodiments, one or more processors 802 may include one or more hardware accelerators 803 (such as, FPGA), wherein at least a portion of a neural network, e.g., second order neurons may operate in the hardware accelerators 803. System memory 804 may include any known volatile or non-volatile memory. Additionally, computer device 800 may include mass storage device(s) 806 (such as solid state drives), input/output device interface 808 (to interface with e.g., cameras, sensors, etc.) and communication interfaces 810 (such as serial interface, near field communication, network interface cards, modems and so forth). The elements may be coupled to each other via system bus 812, which may represent one or more buses. In the case of multiple buses, they may be bridged by one or more bus bridges (not shown).

Each of these elements may perform its conventional functions known in the art. In particular, system memory 804 and mass storage device(s) 806 may be employed to store a working copy and a permanent copy of the executable code of the programming instructions in computational logic 822 implementing the operations described earlier, e.g., but are not limited to, operations associated with the NN 104 of FIG. 1 or of NNs or components associated with FIGS. 2-7. The programming instructions may comprise assembler instructions supported by processor(s) 802 or high-level languages, such as, for example, C, that can be compiled into such instructions. In embodiments, some of the functions, e.g., neural network 204 may be realized with hardware accelerator 803 instead.

The permanent copy of the executable code of the programming instructions and/or the bit streams to configure hardware accelerator 803 may be placed into permanent mass storage device(s) 806 or hardware accelerator 803 in the factory, or in the field, through, for example, a distribution medium (not shown), such as a compact disc (CD), or through communication interface 810 (from a distribution server (not shown)).

Figure 9:
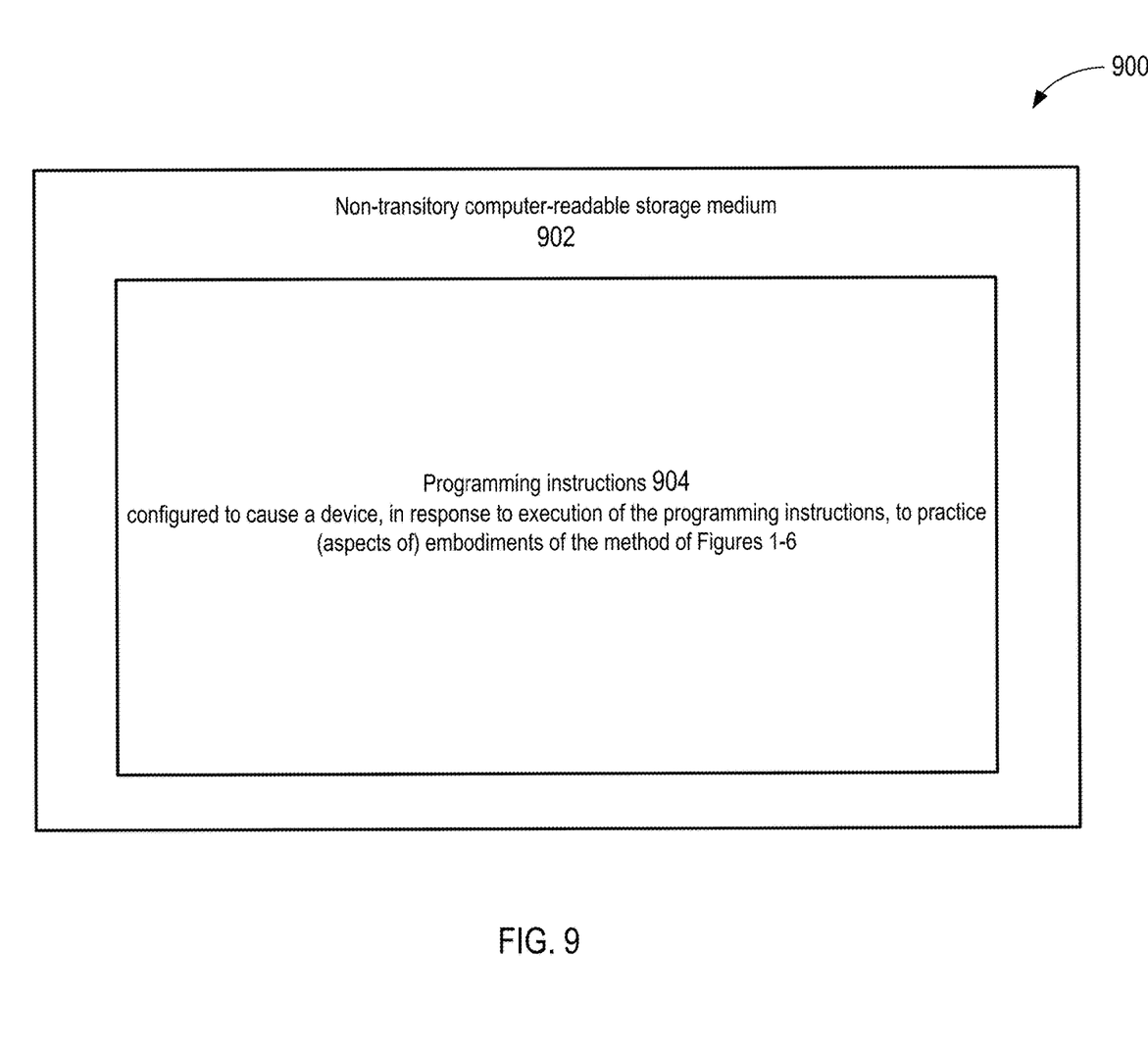
FIG. 9 illustrates an example storage medium with instructions configured to enable a computer system to practice the present disclosure, in accordance with various embodiments.

FIG. 9 illustrates an example storage medium with instructions configured to enable a computer system to practice the present disclosure, in accordance with various embodiments.

As illustrated, non-transitory computer-readable storage medium 902 may include the executable code of a number of programming instructions 904. Executable code of programming instructions 904 may be configured to enable a system, e.g., computer device 800 of FIG. 8 or system 102 of FIG. 1, in response to execution of the executable code/programming instructions, to perform, e.g., various operations associated with higher order multilayer neural networks using homogeneous symmetric tensors. In alternate embodiments, executable code/programming instructions 904 may be disposed on multiple non-transitory computer-readable storage medium 902 instead. In still other embodiments, executable code/programming instructions 904 may be encoded in transitory computer readable medium, such as signals.

In embodiments, a processor may be packaged together with a computer-readable storage medium having some or all of executable code of programming instructions 904 configured to practice all or selected ones of the operations earlier described. For one embodiment, a processor may be packaged together with such executable code 904 to form a System in Package (SiP). For one embodiment, a processor may be integrated on the same die with a computer-readable storage medium having such executable code 904. For one embodiment, a processor may be packaged together with a computer-readable storage medium having such executable code 904 to form a System on Chip (SoC).

Figure 10:
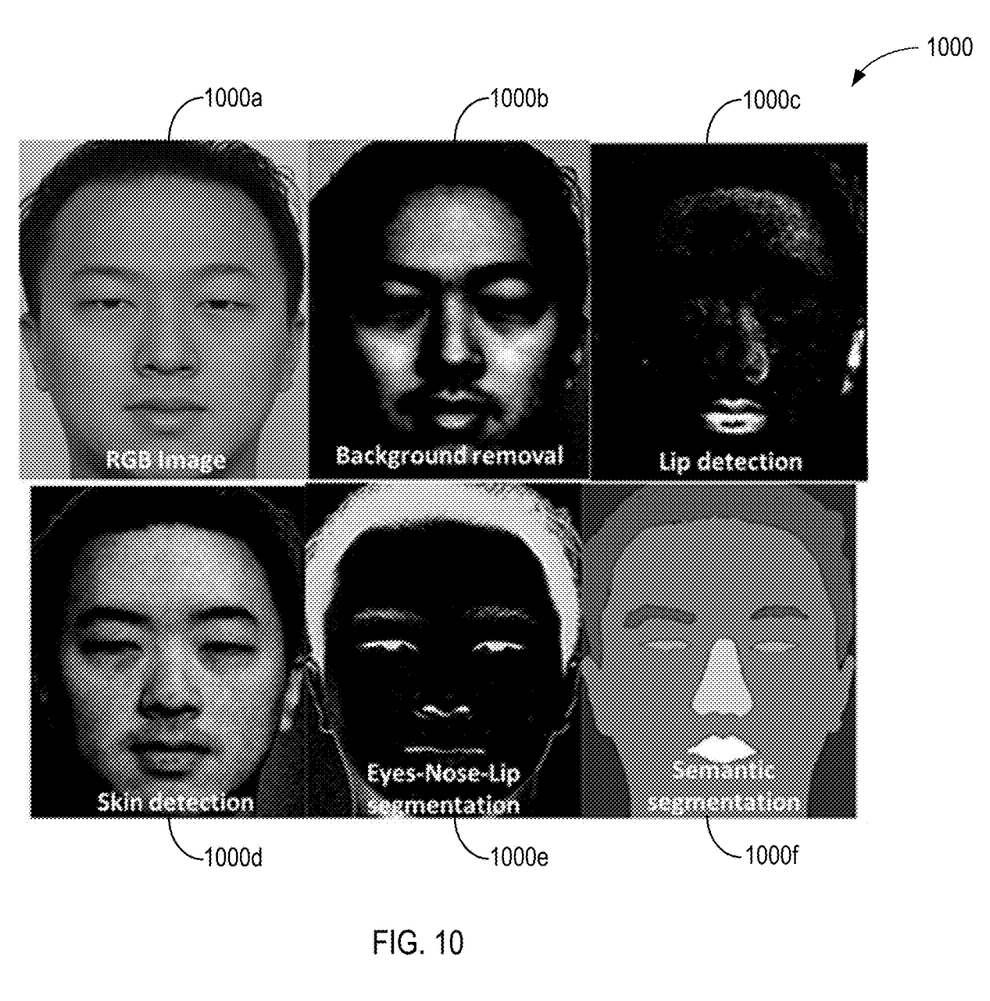
FIG. 10 illustrates an example implementation related to classification problems, in accordance with various embodiments.

FIG. 10 illustrates an example implementation related to classification problems, in accordance with various embodiments. Diagrams 1000a-1000f show various stages of the semantic segmentation that may be applied to lip-reading detection, gesture recognition, face recognition, and the like. Diagram 1000a may represent a RGB image of a face used as input used to train a NN having higher order nodes, such as the nodes 224 within hidden layer 218 of FIG. 2 or node relating to ellipse 430 of FIG. 4.

For example, the RGB image 1000a may be used as input to train the different hidden layers within the NN that include high-order neurons. These hidden layers may be used internally by the NN for background removal 1000b, lip detection 1000c, skin detection 1000d, and/or eyes-nose-lips segmentation 1000e. In embodiments, the combinations of all layers may result in the semantic segmentation of face features 1000f During operation of the NN an input, such as an input of an RGB image, may result in a classification of the input image (e.g. skin detection, lip detection, etc.).

It is to be appreciated that any NN may be implemented using embodiments disclosed herein. As discussed above, because a high-order neuron may be implemented using quadric equations instead of a series of vector weights representing a hyperplane, significantly fewer high-order neurons may be needed to implement a NN having the same level of outcome quality. In turn, the reduced number of nodes may result in a quicker processing time, less computational power used, or less memory used, thus saving computing time and cost.

Example embodiments described include, but are not limited to the following.

Example 1 may be a system comprising: a higher order neural network implemented by one or more computer processors, the higher order neural network is configured to receive an input, to process the input and to generate an output; wherein the higher order neural network has a plurality of layers including an input layer, one or more hidden layers, and an output layer; wherein each of the input layer, the one or more hidden layers, and the output layer includes a plurality of neurons; wherein the plurality of neurons includes at least first order neurons and second order neurons; and wherein inputs at a second order neuron are combined using a symmetric tensor.

Example 2 may include the system of example 1, or of any other example herein, wherein the symmetric tensor is a symmetric matrix, the symmetric matrix combining a plurality of input and a plurality of corresponding transposed inputs.

Example 3 may include the system of example to, or of any other example herein, wherein the inputs are one dimensional, the symmetric tensor is a quadratic tensor, and the symmetric matrix is a 2×2 matrix.

Example 4 may include the system of example 3, or of any other example herein, wherein symmetric matrix represents a selected one of an ellipse, a hyperbola, a parabola, or a plane.

Example 5 may include the system of example 3, or of any other example herein, wherein the output layer is created using one quadratic perception.

Example 6 may include the system of example 2, or of any other example herein, wherein the symmetric tensor is a cubic tensor.

Example 7 may include the system of example 1, or of any other example herein, wherein the higher order neural network is trained using a gradient descendant algorithm, and an activation function.

Example 8 may include the system of example 7, or of any other example herein, wherein the higher order neural network is further trained using an error function to generate a measurement of amount of error for a given input, the amount of error representing a degree of differences of an output generated by the higher order neural network from a corresponding desired output.

Example 9 may be a method for managing a higher order neural network, comprising: identifying inputs for a second order neuron; combining the inputs at the second order neuron with a symmetric tensor; and outputting the combined inputs.

Example 10 may include the method of example 9, or of any other example herein, wherein the symmetric tensor is a symmetric matrix.

Example 11 may include the method of example 9, or of any other example herein, wherein combining the inputs further comprises combining a plurality of input and a plurality of corresponding transposed inputs.

Example 12 may include the method of example 11, or of any other example herein, wherein the inputs are one dimensional, the symmetric tensor is a quadratic tensor, and the symmetric matrix is a 2×2 matrix.

Example 13 may include the method of example 9, or of any other example herein, wherein symmetric matrix represents a selected one of an ellipse, a hyperbola, a parabola, or a plane.

Example 14 may include the method of example 9, or of any other example herein, wherein outputting the combined inputs further comprises outputting the combined inputs to an output layer.

Example 15 may include the method of example 14, or of any other example herein, wherein the output layer is created using one quadratic perception.

Example 16 may include the method of example 9, or of any other example herein, further comprising training the higher order neural network using a gradient descendant algorithm and an activation function.

Example 17 may include the method of example 9, or of any other example herein, further comprising training the higher order neural network using an error function to generate a measurement of an amount of error for a given input, the amount of error representing a degree of differences of an output generated by the higher order neural network from a corresponding desired output.

Example 18 may include the method of example 9, or of any other example herein, wherein the symmetric tensor is a cubic tensor.

Example 19 may include the method of example 9, or of any other example herein, wherein the symmetric tensor is a quartic tensor.

Example 20 may be one or more computer-readable media comprising instructions the cause a computing device, in response to execution of the instructions by the computing device, to: identify inputs for a second order neuron; combine the inputs at the second order neuron with a symmetric tensor; and output the combined inputs.

Example 21 may include the computer-readable media of example 20, wherein the symmetric tensor is a symmetric matrix.

Example 22 may include the computer-readable media of example 20, wherein combining the inputs further comprises combining a plurality of input and a plurality of corresponding transposed inputs.

Example 23 may include the computer-readable media of example 22, wherein the inputs are one dimensional, the symmetric tensor is a quadratic tensor, and the symmetric matrix is a 2×2 matrix.

Example 24 may include the computer-readable media of example 20, wherein symmetric matrix represents a selected one of an ellipse, a hyperbola, a parabola, or a plane.

Example 25 may include the computer-readable media of example 20, wherein outputting the combined inputs further comprises outputting the combined inputs to an output layer.

Example 26 may be an apparatus for managing a higher order neural network, comprising: means for identifying inputs for a second order neuron; means for combining the inputs at the second order neuron with a symmetric tensor; and means for outputting the combined inputs.

Example 27 may include the apparatus of example 26, or of any other example herein, wherein the symmetric tensor is a symmetric matrix.

Example 28 may include the apparatus of example 26, or of any other example herein, wherein means for combining the inputs further comprises means for combining a plurality of input and a plurality of corresponding transposed inputs.

Example 29 may include the apparatus of example 28, or of any other example herein, wherein the inputs are one dimensional, the symmetric tensor is a quadratic tensor, and the symmetric matrix is a 2×2 matrix.

Example 30 may include the apparatus of example 26, or of any other example herein, wherein symmetric matrix represents a selected one of an ellipse, a hyperbola, a parabola, or a plane.

Example 31 may include the apparatus of example 26, or of any other example herein, wherein means for outputting the combined inputs further comprises means for outputting the combined inputs to an output layer.

Example 32 may include the apparatus of example 31, or of any other example herein, wherein the output layer is created using one quadratic perception.

Example 33 may include the apparatus of example 26, or of any other example herein, further comprising means for training the higher order neural network using a gradient descendant algorithm and an activation function.

Example 34 may include the apparatus of example 26, or of any other example herein, further comprising means for training the higher order neural network using an error function to generate a measurement of an amount of error for a given input, the amount of error representing a degree of differences of an output generated by the higher order neural network from a corresponding desired output.

Example 35 may include the apparatus of example 26, or of any other example herein, wherein the symmetric tensor is a cubic tensor.

Example 36 may include the apparatus of example 26, or of any other example herein, wherein the symmetric tensor is a quartic tensor.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A method for implementing a neural network system, the method comprising:

identifying, by the neural network system, a higher order neural network;

identifying, by the neural network system, inputs for a second order neuron of the higher order neural network;

identifying, by the neural network system, a symmetric tensor;

combining, by the neural network system, the identified inputs for the second order neuron with the identified symmetric tensor; and outputting, by the neural network system, the combined inputs.

2. The method of claim 1, wherein the symmetric tensor is a symmetric matrix.

3. The method of claim 1, wherein combining the identified inputs further comprises combining, by the neural network system, a plurality of inputs and a plurality of corresponding transposed inputs.

4. The method of claim 3, wherein the inputs are one dimensional, and the symmetric tensor is a quadratic tensor.

5. The method of claim 1, wherein symmetric matrix represents a selected one of an ellipse, a hyperbola, a parabola, or a plane.

6. The method of claim 1, wherein outputting the combined inputs further comprises outputting, by the neural network system, the combined inputs to an output layer.

7. The method of claim 6, wherein the output layer is created using one quadratic perception.

8. The method of claim 1, further comprising training, by the neural network system, the higher order neural network using a gradient descendant algorithm and an activation function.

9. The method of claim 1, further comprising training, by the neural network system, the higher order neural network using an error function to generate a measurement of an amount of error for a given input, the amount of error representing a degree of differences of an output generated by the higher order neural network from a corresponding desired output.

10. The method of claim 1, wherein the symmetric tensor is a cubic tensor.

11. The method of claim 1, wherein the symmetric tensor is a quartic tensor.

12. The method of claim 2, wherein the symmetric matrix is a 2×2 matrix.

* * * * *

UNITED STATES PATENT AND TRADEMARK OFFICE
CERTIFICATE OF CORRECTION

| | | |
|---|---|---|
| PATENT NO. | : 12,067,477 B2 | Page 1 of 1 |
| APPLICATION NO. | : 17/526628 | |
| DATED | : August 20, 2024 | |
| INVENTOR(S) | : Julio Zamora Esquivel et al. | |

It is certified that error appears in the above-identified patent and that said Letters Patent is hereby corrected as shown below:

In the Claims

Column 12
Claim 5, Line 22, replace "claim 1" with "claim 2" and add "the" after "wherein" and before "symmetric"

Column 12
Claim 11, Line 44, replace "quartic" with "quadratic"

Signed and Sealed this
Seventeenth Day of September, 2024

Katherine Kelly Vidal
*Director of the United States Patent and Trademark Office*